(12) United States Patent
Kinjo

(10) Patent No.: US 7,221,395 B2
(45) Date of Patent: May 22, 2007

(54) DIGITAL CAMERA AND METHOD FOR COMPOSITING IMAGES

(75) Inventor: Naoto Kinjo, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 510 days.

(21) Appl. No.: 09/805,582

(22) Filed: Mar. 14, 2001

(65) Prior Publication Data

US 2002/0001036 A1 Jan. 3, 2002

(30) Foreign Application Priority Data

Mar. 14, 2000 (JP) .............................. 2000-069976

(51) Int. Cl.
*H04N 5/262* (2006.01)
(52) U.S. Cl. ...................... 348/239; 348/36; 382/284
(58) Field of Classification Search ............ 348/231.3, 348/584, 598, 586, 42, 239, 36, 39, 231.6, 348/333.01, 635, 637; 345/634, 635, 637, 345/629; 382/293, 294, 284
See application file for complete search history.

(56) References Cited

U.S. PATENT DOCUMENTS

| | | | | | |
|---|---|---|---|---|---|
| 4,297,724 | A | * | 10/1981 | Masuda et al. ................ 348/77 |
| 4,602,286 | A | * | 7/1986 | Kellar et al. ................. 348/597 |
| 5,107,252 | A | * | 4/1992 | Traynar et al. ............. 345/634 |
| 5,185,808 | A | * | 2/1993 | Cok ............................ 382/284 |
| 5,459,529 | A | * | 10/1995 | Searby et al. ............... 348/586 |
| 5,914,748 | A | * | 6/1999 | Parulski et al. ............. 348/239 |
| 5,917,549 | A | * | 6/1999 | Simons et al. .............. 348/441 |
| 5,982,951 | A | * | 11/1999 | Katayama et al. .......... 382/284 |
| 6,211,913 | B1 | * | 4/2001 | Hansen et al. .............. 348/239 |
| 6,259,469 | B1 | * | 7/2001 | Ejima et al. ............. 348/14.01 |
| 6,393,162 | B1 | * | 5/2002 | Higurashi ................... 382/284 |
| 6,476,874 | B1 | * | 11/2002 | Ito et al. ..................... 348/586 |
| 6,507,359 | B1 | * | 1/2003 | Muramoto et al. ........... 348/47 |
| 6,507,665 | B1 | * | 1/2003 | Cahill et al. ................ 382/154 |
| 6,556,243 | B1 | * | 4/2003 | Dotsubo et al. ......... 348/231.2 |
| 6,621,932 | B2 | * | 9/2003 | Hagai et al. ................ 382/233 |
| 6,636,233 | B1 | * | 10/2003 | Mizutani .................... 345/637 |

FOREIGN PATENT DOCUMENTS

| | | |
|---|---|---|
| JP | 5-142682 | 6/1993 |
| JP | 10-304227 | 11/1998 |

* cited by examiner

*Primary Examiner*—Tuan Ho
*Assistant Examiner*—Chriss S. Yoder
(74) *Attorney, Agent, or Firm*—Morgan, Lewis & Bockius LLP

(57) ABSTRACT

The digital camera includes an image pickup unit, an image storing unit, an image display unit, a reference image designating unit with which one or more of at least partial areas of an image to be referenced for image compositing are designated as a reference image area and an image compositing unit which produces a composite image such that a reference image within the reference image area is displayed as superposed on an image being presently photographed. The image processing method attaches first identification information to one or more of at least partial areas of the specified image and designated area information upon photographing, attaches second identification information to an image in an shooting frame to be composited with the reference image and prepares image data for a composite image obtained by compositing the image with the reference image based on the first and second identification information as well as the designated area information.

27 Claims, 6 Drawing Sheets

FRAME N　　　　　　FRAME N+1

DIGITAL CAMERA AND METHOD FOR COMPOSITING IMAGES

BACKGROUND OF THE INVENTION

This invention relates to a digital camera and an image processing method for preparing composite images such as composite prints obtained by compositing images of two or more subjects.

Digital exposure is a technology by which image information recorded on a film is read photoelectrically and converted to digital image data which are then subjected to various steps of digital image processing before image recording is carried out. This technology has recently been commercialized as the digital photoprinter which generates characters and other image data by image data processing and combines them with the image data of film images, thereby facilitating the production of composites of the film images with the characters, etc.

In the recently developed digital electronic still camera (hereunder referred to simply as the digital camera), an image captured by shooting is recorded as digital image data in a recording medium such as the internal memory built in the digital camera or an IC card and on the basis of the recorded digital image data, the captured image is displayed on a printer or monitor or a composite image is created within the camera. A model is known that can make a single composite by pasting a template to an image taken with the digital camera. Exemplary templates include images such as frames and illustrations and characters such as those in calendars and greeting cards.

If desired, digital image data may be input into the digital photoprinter direct from the recording medium in the digital camera by an image input means so that compositing and various other steps of image processing are performed in the digital photoprinter.

Various methods of image compositing have been known in the art. To mention one approach, an image taken by an image pickup means and additional information as received by a dedicated means from an external device are stored in separate regions and images are presented on a display means as switched between an individual image and a composite. Another approach is for assembling two consecutive images into a panoramic image and involves comparing the overlaps of the two images in lightness and correcting them to have a lightness match.

Unexamined Published Japanese Patent Application (kokai) No. 304227/1198 discloses a digital camera in which the subject being photographed is Presented on the display unit of the camera and overlaid with an already recorded image to facilitate shooting from a fixed position; the disclosed camera has another feature of adding a splice mark to the displayed image so that a big enough panoramic picture can be taken easily. Unexamined Published Japanese Patent Application (kokai) No. 142682/1993 discloses a digital camera which, when caking a panoramic picture, shifts an already recorded image horizontally so that an end of it is displayed within the viewfinder of the camera to facilitate registration for the picture to be taken next.

According to another method, a plurality of photographed images are composited by image processing with personal computers or the digital photoprinter using commercial image processing software such as Adobe's Photoshop®.

However, these prior art methods have had various problems. Consider, first, the case of creating a composite image by pasting a template to a picture taken with the digital camera; usually, the template is preliminarily stored in the camera or recording medium as image data under such conditions as to produce an appropriate output image but the picture is not necessarily an appropriate image and often requires retouching of density, color and gradation due to unsatisfactory exposure conditions, shooting light source and subject's scene. Unless the template is simple enough, it is difficult to distinguish between the template and the picture in the composite and the template image and the pictured image cannot be retouched independently of each other. On the other hand, if one attempts to retouch the whole composite image, the template which has been appropriate is not so any longer. This problem can be dealt with by checking the picture on the liquid-crystal screen of the digital camera, making the necessary adjustments and taking another picture of the scene but this approach is not practically feasible since the photographer either misses the shutter release opportunity or spends an undesirably long time before the final composite is output.

Consider next the case where the picture taken with an image pickup means and the additional information received from an external device are presented on a display means as switched between an individual image or a composite. If a personal computer (PC) is wired as the external device, the picture may be clipped from the composite with a template on the PC screen and subjected to subsequent image processing but this simply requires a lot of manpower. What is more, the image retouched on-screen does not always agree in quality with he image from an output device, indicating the inadequacy of retouching on the display device of the PC which is not calibrated for the output image. The third approach of compositing two consecutive images by matching them in lightness has the problem of limited applicability to the purpose of compositing a photographed image with a preliminarily stored template image.

The digital camera disclosed in Unexamined Published Japanese Patent application (kokai) No. 304227/1998 is primarily intended for achieving registry in taking pictures from a fixed position or shooting a panoramic picture and therefore unsuitable for selecting more than one subject in a scene to create a composite image. The digital camera disclosed in Unexamined Published Japanese Patent Application (kokai) No. 142682/1993 is also unsuitable for assembling two or more subjects since its principal objective is to achieve registry in taking a panoramic picture by simply presenting an end of the photographed image.

The use of commercial image processing software on a personal computer or digital photoprinter tends to produce composite images that do not look natural if individually photographed images of subjects are to be assembled.

SUMMARY OF THE INVENTION

The present invention has been accomplished under these circumstances and has as an object providing a digital camera which facilitates not only the preparation of composite images, especially composite prints obtained by compositing images of two or more subjects but also the taking of stereoscopic pictures.

Another object of the invention is to provide an image processing method capable of attaining the same result as described above.

In order to attain the object described above, the first aspect of the present invention provides a digital camera comprising: an image pickup unit for imaging a subject to obtain digital image data; an image storing unit for storing at least the digital image data of a photographed image chat is obtained with the image pick up unit; an image display unit for displaying at least an image being presently photographed; a reference image designating unit with which one or more of at least partial areas of an image to be referenced for image compositing are designated as a reference image area; and an image compositing unit which produces a composite image such that a reference image within the reference image area is displayed on the image display unit as superposed on the image being presently photographed.

Preferably, image data for the image to be referenced for image compositing is data for either the photographed image or a specified image to be quoted.

Preferably, the reference image area is displayed in a specified position, a position on the image to be referenced for image compositing or a designated position on the image display unit.

Preferably, the reference image is processed by at least one processing step selected from the group consisting of translation, rotation, resizing, density/color retouching, binarization, edge enhancement, change in painting brushwork and change in light transmittance.

Preferably, the reference image being displayed on the image display unit is automatically enlarged or reduced in accordance with a magnification of an image being presently photographed.

It is preferable that the digital camera further includes a function to focus on a large number of rangefinding points, wherein a focused area of the subject is allowed to be automatically clipped out as the reference image.

It is also preferable that the digital camera further includes a stereophotographic mode, wherein, if set to the stereophotographic mode, an area in which a focal distance at infinity is clipped out automatically as the reference image.

Preferably, the reference image designating unit performs designation of the reference image area by designating one or more of at least partial areas of the image to be referenced for image compositing that is displayed on the image display unit.

Preferably, the image storing unit further stores the image data for the image to be referenced for image compositing.

It is further preferable that the digital camera further comprises a camera control unit for performing control upon photographing such that a principal subject in the reference image and a principal subject in the image being presently photographed are equal to each other in density and color tint.

In order to attain another object described above, the second aspect of the present invention provides an image processing method, comprising steps of: photographing a subject to acquire digital image data; and assembling it with image data for a specified image to be referenced for image compositing to prepare image data for a composite image; further comprising the steps of: upon photographing, attaching to one or more of at least partial areas of the specified image to be referenced for image compositing first identification information indicating that the one or more of at least partial areas are a reference image to be composited, and designated area information; and attaching to an image in an shooting frame which is to be composited with the reference image second identification information indicating that the image in the shooting frame is to be composited; as well as upon image outputting, preparing image data for a composite image obtained by compositing the image in the shooting frame with the reference image based on the first and second identification information as well as the designated area information.

Preferably, the attaching step upon photographing further attaches processing information which refers to what processing step is to be performed or light transmittance information upon compositing which represents a specified light transmittance for use in image compositing and the image data for the composite image is prepared based on the first and second identification information, the designated area information and the processing information or light transmittance information upon compositing.

Preferably, in addition to the first and second identification information, information about order of image compositing is used to prepare the image data for the composite image.

Preferably, information about a large number of rangefinding points is further obtained and a focused area of the subject is allowed to be automatically clipped out as the reference image to prepare the image data for the composite image.

It is preferable that the image processing methods further includes a stereophotographic mode, and, if the stereophotographic mode is set, image data for a stereoscopic image is prepared after any positional or angular offset between image areas in which a focal distance is at infinity on frames which are to be used in the stereophotographic mode is optionally corrected.

Preferably, the image data for the composite image is used for producing a composite print, recorded on an image data recording medium and delivered through a telecommunication network.

Preferably, camera control is further performed upon photographing such that a principal subject in the reference image and a principal subject in the image being presently photographed are equal to each other in density and color tint.

Preferably, adjustment is further performed when image compositing upon the image outputting such that a principal subject in the reference image and a principal subject in the image being presently photographed are equal to each other in density and color tint.

Preferably, the reference image or the image to be composited with the reference image is a motion image In order to attain another object described above, the third aspect of the present invention provides an image processing method, comprising steps of: photographing a subject to acquire digital image data; and assembling it with image data for a specified image to be referenced for image compositing to prepare image data for a composite image; further comprising the steps of: upon photographing, preparing editing information including information about a name or a frame number of an image in a frame to be quoted as a reference image to be composited that is within the specified image to be referenced for image compositing, designated area information representing one or more of at least partial areas of the image in the frame to be quoted, and information about a name or a frame number of an image in a shooting frame to be composited with the reference image; and upon image outputting, preparing image data for a composite image obtained by compositing the image in the shooting frame with the reference image based on the editing information.

Preferably, the editing information further includes processing information which shows what processing step is to be performed to a designated area by the designated area information.

Preferably, the editing information further includes information about order of image compositing or light transmittance information upon compositing which represents a specified light transmittance for use in image compositing.

In order to attain another object described above, the fourth aspect of the present invention provides an image processing method, comprising steps of: photographing a subject to acquire digital image data; and assembling it with image data for a specified image to be referenced for image compositing to prepare image data for a composite image, further comprising the steps of: upon photographing, designating at least one reference image within a specified image to be referenced for image compositing with at least one of a plurality of cameras and attaching reference image designation data to the reference image; sending and receiving image data for the at least one reference image designated among the plurality of cameras; attaching to photographed images respectively photographed with the plurality of cameras which are to be composited with the reference image group identification information indicating that the photographed images belong to a unique group; and on image outputting, compositing the photographed images respectively photographed with the plurality of cameras with the at least one reference image by using the photographed images respectively photographed with the plurality of cameras, the reference image designation data and the group identification information.

DETAILED DESCRIPTION OF THE INVENTION

The digital camera and image processing method of the invention are now described in detail with reference to the preferred embodiments shown in the accompanying drawings.

Figure 1:
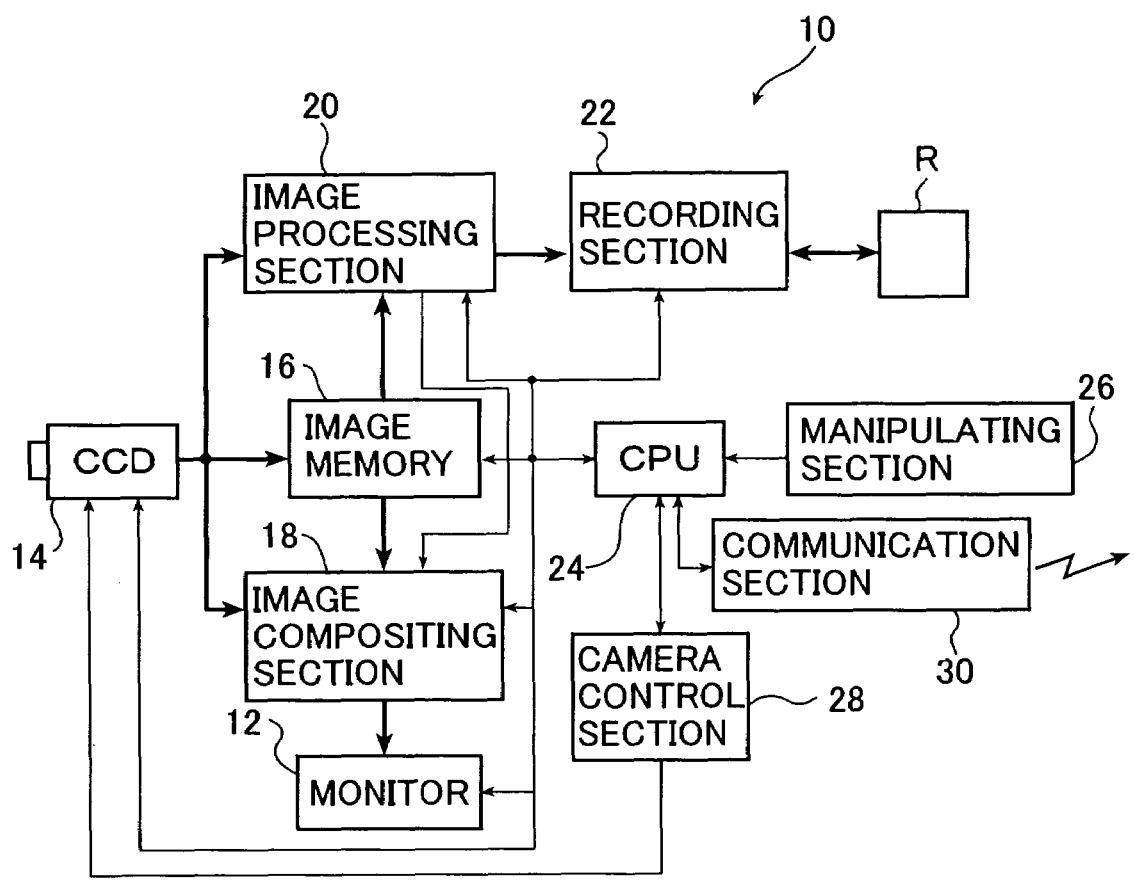
FIG. 1 is a block diagram outlining an embodiment of a camera (digital still camera) according to the present invention.

FIG. 1 is a block diagram outlining an embodiment of the digital still camera according to the first aspect of the invention.

In FIG. 1, the digital still camera (hereunder referred to simply as the camera) generally indicated by 10 includes a CCD image pickup device (hereunder referred to simply as CCD) 14 which takes a picture of a subject to obtain digital image signals (data), an image memory 16 for storing the image data obtained by the CCD 14, an image compositing section 18 by which the already photographed image (image data) stored in the image memory 16 and an image (image data) being presently photographed are composited for monitor display, and a monitor 12 for displaying a composite image.

The camera 10 also includes an image processing section 20 which performs various steps of image processing to create an output image, an recording section 22 for recording the image data for output on an image data recording medium (hereunder referred to simply as recording medium) R such as smart media and memory sticks, a CPU 24 for controlling the overall capabilities of the camera 10 including the sections (units) mentioned above, and a manipulating section 26 with which the photographer designates for the camera 10 a reference image or reference image area used for creating a composite image and gives it other instructions.

The camera 10 further includes a camera controlling section 28 for performing camera control such as automatic exposure control and automatic focusing control based on the control by the CPU 24. The camera controlling section 28 includes, although not shown, various types of sensor required for camera control such as automatic exposure control and automatic focusing control, a device for focusing by means of imaging lenses, a device for adjusting a shutter speed, a device for controlling a storage time of the CCD 14, a device for adjusting a diaphragm etc. as required, a node selecting device for selecting any one from among the stereophotographic mode, the sequential shooting (motor driven shooting) mode and the video (motion picture) shooting mode, and the like.

The camera 10 may also include a communication section 30 for performing the inter-camera communication or the communication through a telecommunication network such as the Internet.

Figure 2A:
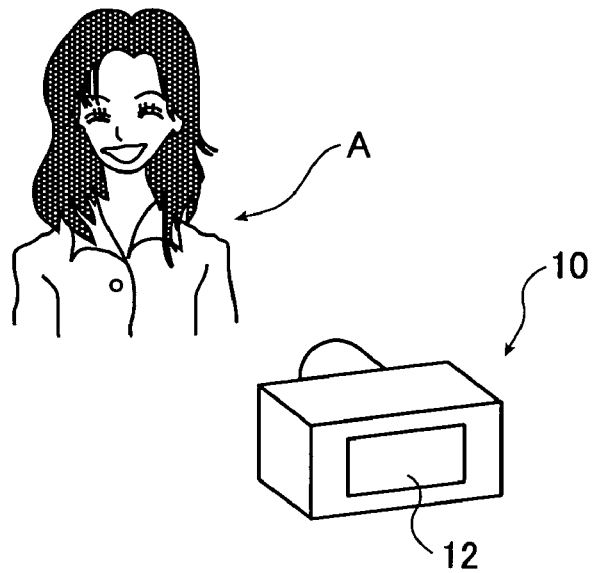
FIG. 2A illustrates how a subject is photographed with the camera shown in FIG. 1 in an embodiment of an image processing method according to the present invention.
Figure 2B:
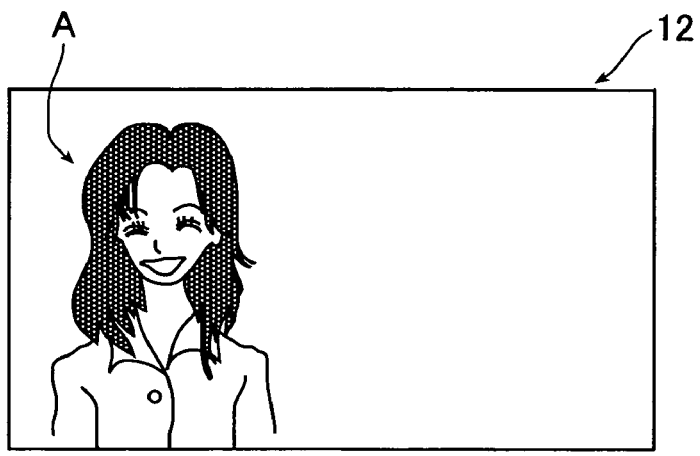
FIG. 2B illustrates the display on the monitor of the camera.
Figure 2C:
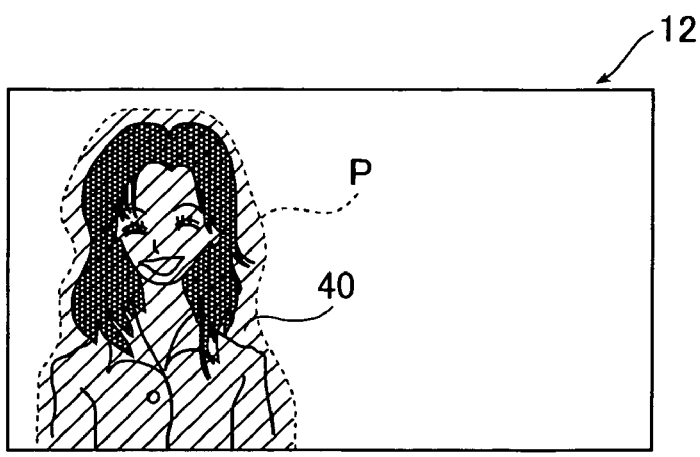
FIG. 2C illustrates how the reference image is outlined.

We now describe the first embodiment of the image processing method according to the second and third aspects of the present invention with reference to FIGS. 2 and 3 which illustrate how the camera is used in this embodiment of the image processing methods of the invention. FIG. 2A shows how subject A is photographed with the camera 10 as the image being taken is displayed on a monitor 12 on the back surface of the camera 10 (see FIG. 2B).

When the subject A is photographed with the camera 10, the image signals (data) representing the image (frame) of the subject A are obtained by the CCD 14 and stored in the image memory 16. The image data of the frame carrying the taken image (designated the Nth frame) is read out of the image memory 16 upon taking of the next image (frame N+1) and inputted to the monitor 12 after subjected to the thinning(2) processing to reduce the pixel density corresponding to the monitor display, then displayed on the monitor 12. Looking at the display of the monitor 12, the photographer designates a reference area 40 as the part which he wants to reference, that is, he wants to use as composited with the image being taken (frame N+1) by encircling it, as shown with the dashed line P in FIG. 2C. The designation of the reference area 40 is performed by means of the manipulating section 26. If the manipulating section 26 is equipped with an electronic pen, for example, the photographer may use it to designate the reference area 40 on the monitor 12 either manually or by encircling with a suitable shape such as a rectangle, a circle or an ellipse. Needless to say, for the designation of the reference area 40 by means of the manipulating section 26, any method other than one using an electronic pen may also be employed. In addition, a single image (frame) may be wholly designated as the reference area 40 or more than one reference area 40 may be designated within a single image (frame).

Figure 3A:
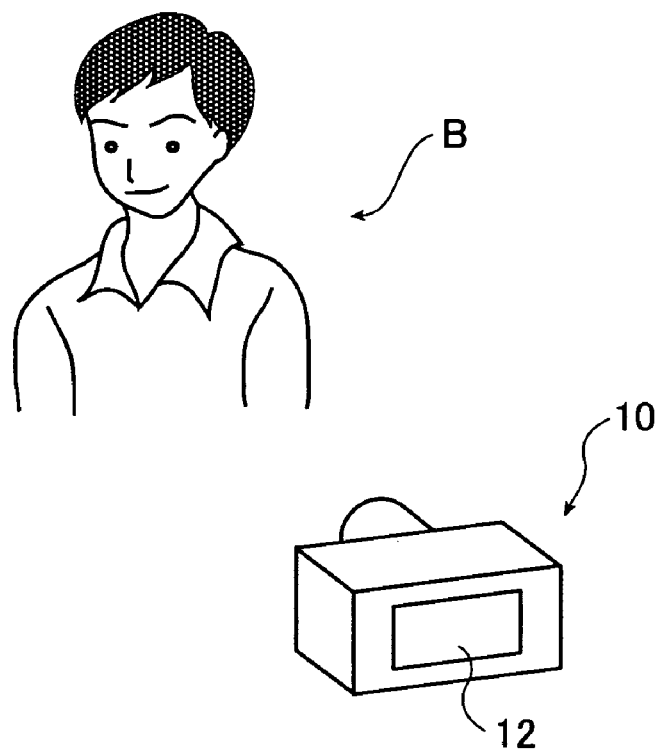
FIG. 3A illustrates how another subject is photographed with the camera in the same embodiment.

In the next step, a subject B is photographed with the camera 10 to obtain frame N+1 which is to be composited with the already photographed frame N (see FIG. 3A). In response to a photographer's command from the manipulating section 26, the image compositing section 18 composites two images, one being the image in the reference area 40 of the image in the already photographed frame N and the other being the image of the subject B being presently taken, namely the image read by the CCD 14 for displaying on the monitor 12 and subjected to the thinning processing to have the pixel density suitable for display, and the composite image is displayed on the monitor 12 (see FIG. 3B).

When the composite of the image in the reference area 40 (the reference image) and the image of the subject B (the image being taken) is being displayed on the monitor 12, the percentage of each image can be altered by the photographer who designates a desired value. In practice, the light transmittance of the reference image is varied so that the image being taken can be readily distinguished from it on the monitor 12. Therefore, in the region of the monitor 12 in which the reference image is being displayed, the composite of the translucent reference image and the actual image being taken can be displayed at varying stages of the scale ranging from 100% reference image to 100% image being taken. The light transmittance may vary stepwise in the reference area 40. For example, the light transmittance is higher (that is, the weight of the reference image for compositing is smaller) as nearer to the periphery of the reference area 40.

The light transmittance as above may be set differently between cases of displaying on the monitor 12 and actually outputting images as prints, for example. Accordingly, the reference image being displayed on the monitor 12 may be translucent so that the subject B can easily have registry on the monitor 12 whereas, upon outputting of reproduced images such as prints, the percentage of the reference image may be 100%.

After confirming that the monitor 12 displays the composite showing the image being taken and the reference image in superposition (see FIG. 3B), the photographer takes the image of the subject B. The composite image is only displayed on the monitor 12 and the picture of the subject B actually taken does not include the reference image. The taken picture of the subject B is stored in the image memory 16.

At the same time, in response to a photographer's command from the manipulating section 26 is attached compositing-editing information such as identification information (data) indicating that the image in frame N is to be referenced for image compositing or identification information (data) indicating that the image in frame N+1 is to be composited with the reference image. Attached to the image of frame N are (the first) identification information indicating that this image is to be referenced for image compositing and designated area information which represents the designated reference image area (the reference area), or information such as processing information which shows what processing is to be performed on the reference image in the reference area 40 and after-compositing light transmittance information which represents the light transmittance of the reference image upon outputting of images as prints etc. Attached to the image in frame N+1 is (the second) identification information which indicates that this image is to be composited with the reference image.

The shape data in the designated area information may be expressed by various methods and if an area so any shape is designated, applicable methods include the information for the pixels around it (defining the pixel positions or pixel linking information such as a chain code), a table assigning different area numbers to the positions of the pixels within the designated area, and a table assigning light transmittance data to the positions of the pixels within the designated area.

In the camera 10, the image data for the taken image of the subject A in the Nth frame and the image data for the taken image of the subject B in the (N+1)th frame are read out of the image memory 16, subjected to various image processing steps such as color/density correction and converted corresponding to the recording medium R to the image data for the output in the image processing section 20, then recorded on the recording medium R in the recording section 22.

To the image data recorded on the recording medium R is attached the compositing-editing information as stated above. In particular, to the image data for the taken image in frame N used for image compositing are attached (the first) identification information indicating that the usage includes the reference image and designated area information or information such as processing information and after-compositing light transmittance information concerning the reference image whereas to the image data for the taken image in frame N+1 used for image compositing is (the second) identification information indicating that the image is to be composited with the reference image.

In this way, upon photographing, the image data for the taken images as above are acquired and to such image data is attached the compositing-editing information in the camera 10.

In accordance with the invention, upon image outputting, the taken image data acquired on photographing and the compositing-editing information attached thereto are employed in the photoprinter.

Figure 4:
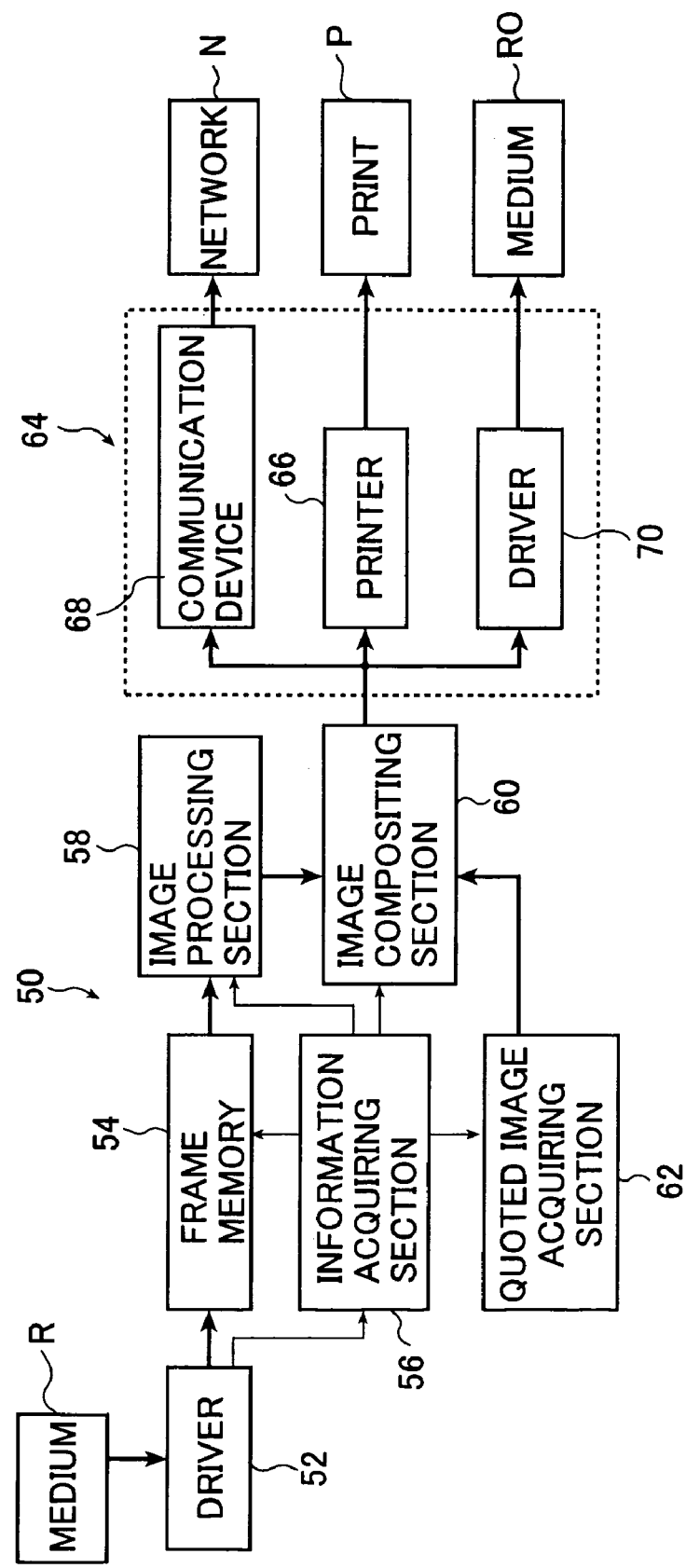
FIG. 4 is a block diagram outlining an embodiment of the photoprinter which performs compositing of images and outputting of composite images in an image processing method according to the present invention.

FIG. 4 shows an embodiment of the photoprinter used upon image outputting in the image processing method of the invention.

The photoprinter 50 as shown includes a driver 52 for reading out of the recording medium R the image data such as the image data for the taken image to be composited with the reference image and the image data for the taken image to be referenced for image compositing as well as the compositing-editing information such as the first and second identification information and designated area information or processing information and after-compositing light transmittance information concerning the reference image; a frame memory 54 for storing the image data read out by the driver 52; an information acquiring section 56 which acquires and stores the compositing-editing information read out by the driver 52; an image processing section 56 for reading out the image data stored in the frame memory 54 and subjecting it to various processing steps required for image outputting; an image composition section 60 which assembles the image data for the taken image to be composited with the reference image with the image data for the reference image incorporated into the image data for the taken image to be referenced for image compositing, based on the compositing-editing information from the information acquiring section 56; a quoted image acquiring section 62 for acquiring the quoted image data which is used instead of the image data for the taken image to be referenced for image compositing; and an image outputting section 64 which outputs a reproduced image or a reproduced image data obtained from the composite image data prepared in the image compositing section 60.

The image compositing section 60 assembles the image data for tine image to be composited with the reference image with the image data for the reference image incorporated into the image data for the image to be referenced for image compositing, using the light transmittance of the reference image based on the after-compositing light transmittance information from the information acquiring section 56. The image data for the image to be composited with the reference image is based on the second identification information from the information acquiring section 56 and the image data for the image to be referenced for image compositing is based on the first identification information from the information acquiring section 56, whereupon the reference image is designated on the basis of the designated area information or processing information concerning the reference image. The image compositing section 60 may acquire, based on the compositing-editing information from the information acquiring section 56, the quoted image data which provides the reference image from the quoted image acquiring section 62, instead of the image data for the taken image to be referenced for image compositing, which data obtained from the frame memory 54 through the image processing section 58. Further, the image data or the compositing-editing information may be read not out of the recording medium R by the driver 52 but directly cut of the image memory 16 of the camera 10.

The image outputting section 64 includes a printer 66 which outputs a reproduced image prepared by image compositing as a photographic print P; a communication device 68 for distributing the image data for a reproduced image prepared by image compositing through a telecommunication network N such as the Internet; and a media driver 70 which records the image data for a reproduced image prepared by image compositing on an image data recording medium, RO such as MO, CD-R, FD or the like and outputs the recording medium RO having such data recorded thereon.

According to the present invention, the image data for a reproduced image prepared by image compositing can be outputted in any of three output forms as above. In the following, the case of being outputted as a photographic print P by the printer 66 is considered as typical and the procedure performed by the photoprinter 50 upon image outputting in the image processing method of the invention will be described in more detail on the basis of the first embodiment stated as above.

Figure 5:
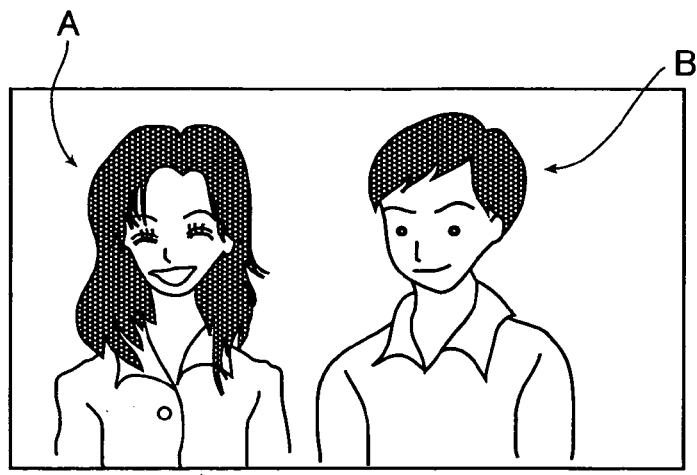
FIG. 5 illustrates the final print obtained by the method of the invention.

In the print mode, the identification information which indicates that the reference image and the image being taken are to be composited, as well as outlining information such as frame number, outline's position, shape data and after-compositing light transmittance are used in the photoprinter 50 such that the reference image (of frame N) and the image being taken (of frame N+1) are composited by weighted averaging to create a composite image which, as shown in FIG. 5, is of the same scene as was previously displayed on the monitor 12

As already mentioned, the print light transmittance may differ from the value for monitor display. If no special processing is to be performed on the reference image boat 100% reference image is to be composited with the image being taken, the photographer has only to give a command for compositing and there is no need to set processing information or light transmittance information. The compositing mode may be so set that it can be turned on or off after taking all pictures to be composed and the photographer may choose not to create a composite.

In the foregoing description, identification information and all other necessary information are attached to each image frame. Alternatively, editing information including information about the name or number of the frame to be quoted as the reference image, designated area information, information about the name or number of the frame to be composited with the reference image, and optionally processing information and after-compositing light transmittance information may he created, stored and subsequently used to produce a print showing the composite of the two images.

Figure 3B:
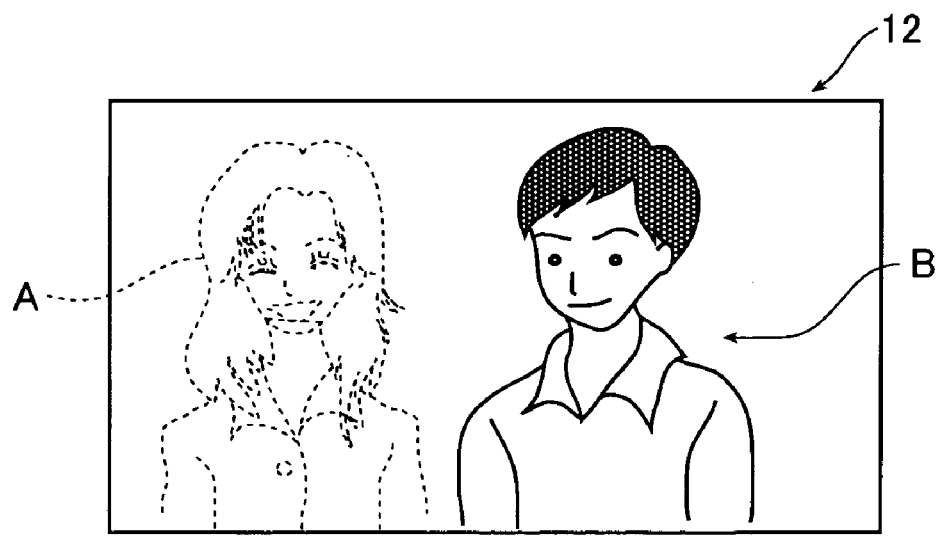
FIG. 3B illustrates how two subject images are displayed in superposition on the monitor of the camera.

Thus, in the first embodiment, one of the two images to be referenced for image compositing is partially designated as the reference image and superposed as a translucent image on the image being taken, with the resulting composite being displayed on the monitor as shown in FIG. 3B. This provides ease of attaining registry between the images to be composited and therefore has potential use in various applications as set forth below. Images need not be displayed on the monitor but may be presented within the viewfinder of the camera.

In the foregoing embodiment, a picture already taken with the camera is used as the reference image but this is not the sole case of the invention and a background template, a character pattern, a computer graphics (CG) image and the like may be held within the image memory 16 of the camera 10 or captured from a communication means such as the Internet for subsequent use. For example, the image of a rare animal or the like is displayed on the monitor with a controlled light transmittance and a child is photographed as his image is overlaid with the animal's image on the monitor to take a scene showing the child holding the animal in his arms. By checking the composite image on the monitor, the photographer can easily get the child pose as if he were holding the animal in his arms. In such a case, in the image memory 16 of the camera 10 may be stored only the reference image data having a lower pixel density for monitor display and in the quoted image acquiring section 62 of the photoprinter 50 may be stored the reference image data having a higher pixel density corresponding to the output pixel density of a photographic print P.

In the foregoing embodiment, the reference image is designated by the photographer who outlines it with an electronic pen. Manual input is not the sole method of designating the reference image and, alternatively, the area of the subject at nearest distance or the area in focus may be regarded as the principal subject and clipped out automatically.

In the foregoing embodiment, the reference image is directly composited with the image being taken to create a composite. If desired, the reference image may be subjected to various processing steps such as shift, rotation, resizing, density/color retouching, binarization, edge enhancement, as well as artistic changes in the brushwork of painting (e.g. paint in oils or watercolors) on the basis of commercial image processing software such as Photoshop®, in the image processing section 20 of the camera 10 or the image processing section 58 of the photoprinter 50.

If desired, the final composite of the images in frames N and N+1 may be stored in the internal memory of the camera and further used as the reference image to be composited with the images in frames N+2 onward.

In another modification, the size or the reference image is adjusted automatically in accordance with the magnification of the image being taken and the resulting composite is displayed on the monitor (size comparison and scale compositing).

If desired, information about the order of compositing may be added to the identification information so that individual images are composited together and printed in a specified order.

In the conventional method of compositing, individually photographed image frames are clipped and pasted by performing image processing on a personal computer. Compared to this technique, the method above-described as the first embodiment of the method of the invention provides the photographer with flexibility in determining the right composition for taking pictures that are to be composited together and this goes a long way to offer a lot of amusement. As an ancillary advantage, the views displayed on the monitor can be used for simple size comparison and measurement.

If desired, the camera control may be performed upon photographing in the camera 10 or the image compositing processing may be performed in the photoprinter 50 such that the principal subject in the reference image to be used for image compositing and the principal subject in the image being taken or in the already taken image to be composited with the reference image are equal to each other in density, color or both of them.

In the camera 10, for example, the camera controlling section 29 may be controlled by the CPU 24 to control the automatic exposure of the camera 10 by the adjustment of an aperture of the diaphragm (not shown), a shutter speed or a storage time of the CCD 14 such that the density of the principal subject such as a face of a person in the image being taken is almost the same as the density of the principal subject such as a face of a person in the reference image. Alternatively, the camera control data on photographing of the image including the reference image to be used for image compositing may be recorded and subsequently employed for the camera control on photographing of the image to be composited with the reference image.

In the photoprinter 50, image compositing may be performed in the image compositing section 60 after the color density is adjusted in the image processing section 58 based on the principal subject in the reference image or the image being taken, or based on simple averaging or weighted averaging of two images as above to achieve the same density or color tone between these two images. Such a color tone adjustment as above-mentioned may also be performed in the image compositing section 60.

The concept of the invention finds another important application if, in the image processing method of the invention, the reference image is adjusted to have a varying light transmittance on the monitor as it is superposed on the image being taken. This technique provides ease in taking panoramic pictures as described below.

Figure 6:
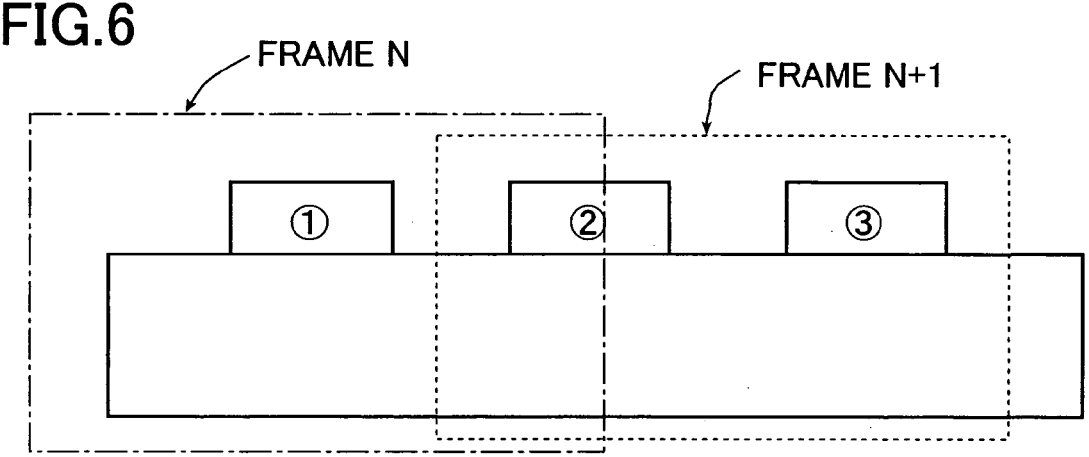
FIG. 6 illustrates now a panoramic picture is taken using the method of the invention.

To take panoramic pictures, the photographer sets a panoramic mode by the manipulating section 26 of the camera 10. Then, as shown in FIG. 6, he shoots successive frames N and N+1 of the subject at varying views of angle. In this case, an edge image of the previous frame is displayed translucent as indicated by the dashed lines Q in FIG. 7.

Figure 7:
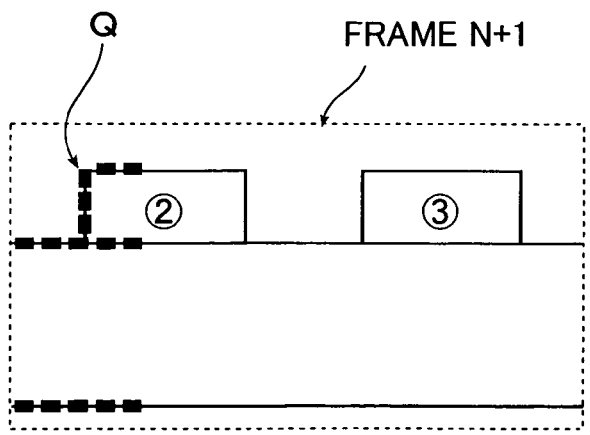
FIG. 7 illustrates a monitor display presented during the taking of a panoramic picture using the method of the invention.

In the case shown in FIG. 6, the camera 10 is moved from left to right to take pictures of the subject and when shooting frame N+1, the edge image which is right of frame N is displayed at the left end of the screen of the monitor 12 as indicated by the dashed lines Q in FIG. 7. If necessary, the tilt of the camera 10 may be detected automatically so that the monitored image is flipped vertically depending on the result.

All that is required for the photographer to take pictures is determining the angle of view at which the areas of interest of the previous image (frame N) and the image being actually taken (frame N+1) overlap. This can be easily done by looking at the screen of the monitor 12.

To print with the photoprinter 50, the overlapping portions of the two images are linked to produce one final panoramic picture, which may be used for monitor display.

If desired, the camera 10 may be adapted to perform automatic matching so that it tells an optimum angle of view. This contributes to efficient panoramic photography.

We now describe the second embodiment of the image processing method of the invention in which the concept of the invention is applied to stereoscopic photography.

Figure 8:
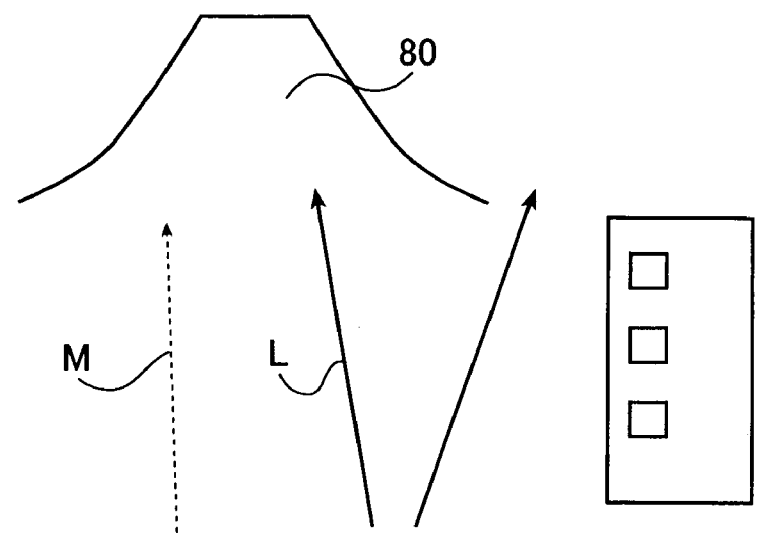
FIG. 8 illustrates how a stereoscopic picture is taken using the method of the invention.
Figure 8:
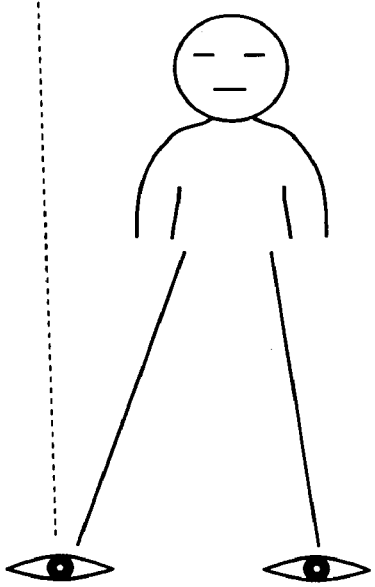
Figure 8:
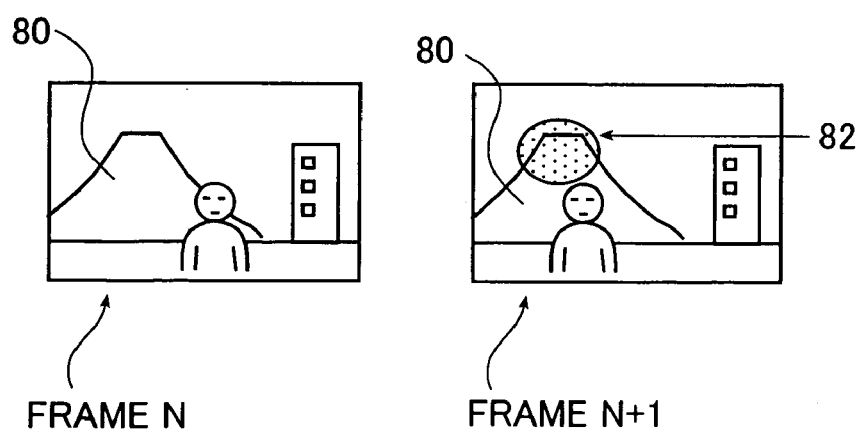

To take a stereoscopic picture, the photographer sets a stereoscopic mode by the manipulating section 26 of the camera 10. He then translates the camera 10 and takes two successive frames N and N+1, the first being the image as viewed with the left eye and the second with the right eye (see FIG. 8).

A portion of the afterimage of the previous image (frame N) is displayed either on the monitor 12 or within the viewfinder. From the image of frame N (which was viewed with the left eye in the case shown in FIG. 8), the area having the largest camera-to-subject distance (which is a mountain 80 as seen from afar in FIG. 8) is clipped out automatically and displayed on the monitor screen, deliberately in the same position as in the image of frame N+1 which is currently taken (as viewed with the right eye in the case shown in FIG. 8). In landscape photography, a mountain and other subjects that are seen from afar can essentially be regarded as points at infinity; as for a point at infinity, the right and left eyes can safely be regarded as seeing it at substantially the same view of angle (with parallel optical axes) as indicated by lines L and M in FIG. 8, so the image of that point at infinity (the image of the mountain 80) generally appears to be in the same position in each of frames N and N+1.

All that is required for the photographer to shoot frame N+1 is determining the view of angle at which the afterimage of the previous frame N and the area of interest of the image of frame N+1 being actually taken overlap. The overlapping area of frame N+1 is indicated by 82 in FIG. 8. In short, the photographer only needs to shoot the two frames such that they overlap in the same area of the subject. Registry between the two images can be achieved quite easily if an edge of the afterimage of the previous frame is made translucent.

To print, the photographer may produce a stereoscopic image in which two relevant frames (showing the images viewed with right and left eyes, are put side by side or he may produce one final stereoscopic picture using a lenticular process.

Stereoscopic photography has conventionally required the use of a dedicated camera, adapters such as mirrors and lenses, and application of special equipment as by coupling two cameras. This is no longer the case with the second embodiment as stated above and optical axis alignment can be achieved positively without extra devices such as a compass, thus providing great ease in taking stereoscopic pictures.

The above-described stereophotographic technique in which registry between two images is achieved with the aid of monitor display has a problem in that if the precision of monitor display is not high enough or if the camera shakes, the image of the point at infinity might be positionally offset between the two frames. This results in failure to meet the prerequisite for the stereophotographic mode, i.e., the production of two images, one being viewed with the right eye and the other with the left eye, that can safely be regarded to have parallel optical axes.

It is therefore desirable to make a positional correction in the process of preparing stereoscopic prints with the photoprinter 50 at a laboratory. An exemplary corrective procedure is as follows.

Suppose two frames N and N+1 are shot in the stereophotographic mode. From the image of frame N, the area where the camera-to-subject distance is at infinity is clipped out automatically; then, pattern matching between frame N and frame N+1 which is to be combined with frame N to create a stereoscopic print is effected by positional offsetting to detect an offset correcting vector that provides best fit between the two frames with respect to said area at infinity.

In the next step, the whole image of frame N is translated by an amount corresponding to the offset correcting vector until it has no positional offset from frame N+1 with respect to the area at infinity; the images of the two frames can now be used to produce a stereoscopic print.

While the above description concerns the correction of the positional offset between the two frames by translation, a similar method may be employed to correct offsets in rotational angle.

We next describe the third embodiment of the image processing method of the invention In this embodiment, the concept of the invention is applied to the motion picture shooting mode.

This third embodiment can be achieved by adding to the various procedures performed to still pictures in the first and second embodiments of the image processing method of the invention as described before the information for designating the start and the termination of the reference image or the image to be composited with the reference image (image being taken) in the motion picture mode, as well as the editing information as stated before.

In this case, it is preferable that the motor driven shooting (sequential shooting) mode or the video shooting mode can be set in the camera 10. Alternatively, the camera 10 itself may be preferably a digital video camera.

We now describe the forth embodiment which represents the image processing method according to the forth aspect of the invention. In this embodiment, the image processing method of the invention is applied to a plurality of cameras which can communicate with one another.

In the fourth embodiment, each camera 10 used includes the communication section 30 (see FIG. 1). Reference image data is sent and received among a plurality of cameras 10 and to reference images for image compositing or images to be composited with the reference image in the respective cameras 10 is assigned the group identification information (ID) indicating that the images constitute a unique group. Upon image compositing in the photoprinter 50, the taken images of respective cameras 10 are composited with the reference image, using such group ID.

In a first example of this embodiment, a reference image is designated with a first camera 10 and the reference image data is transferred to a second camera 10 by wire or by radio. The reference image data has group ID added thereto which may be provisionally set. Since the reference image data transferred is for monitor display, the resolution represented by the data may be lower than that of an original image such as a taken image.

Next, a subject is photographed with the second camera 10 while displaying the reference image received from the first camera 10 on the monitor 12. The image data for the image thus photographed with the second camera 10 is recorded after adding of group ID. It is not necessary to record the reference image data received itself.

Upon image compositing, the image compositing is performed in the photoprinter 50 using the taken image data of the first and second cameras 10, the reference image designation data and group ID.

In a second example of this embodiment, the original image data (representing a higher resolution) is used as the reference image data to be transferred from a first camera 10 to a second camera 10. In this case, the reference image data may be recorded together with the taken image data, so that the image compositing process can be performed in the photoprinter 50 solely using the data of the second camera.

In a third example of this embodiment, the designation of the reference image as well as the sending and receiving of the reference image data may be performed among more than two cameras 10, then a composite image prepared in the photoprinter 50.

In a forth example of this embodiment, images grouped with the procedures in the first to third examples as above may be used for preparing index images or motion images for sequential frame reproduction, in addition to image compositing in the photoprinter 50 as stated above.

In the image processing method of the invention, the camera in which taken images are obtained upon photographing and various types of compositing-editing information are attached to the taken images is not limited to the digital camera 10 of the invention. Conventional optical cameras which record taken images on an image recording medium such as photographic film F, so-called analogue cameras, may be also used as long as provided with components capable of carrying out the image processing method of the invention. An analogue camera used in the image processing method of the invention is provided with all components of the digital camera 10 shown in FIG. 1 but the recording section 22, for example. It may include, instead of the recording section 22, a recording section in which various types of compositing-editing information are recorded in association with a shooting frame of a film, recorded on a magnetic layer formed on a film in case of an APS photographic film, in an IC chip in case of a film cartridge with an IC chip, and in an IC card in case that the camera is equipped with an IC card.

While the digital camera and image processing method of the present invention have been described above in detail referring to various embodiments, it should be understood that the invention is by no means limited to the foregoing embodiments and various improvements and modifications can be made without departing from the scope and spirit of the invention.

As described on the foregoing pages, the present invention may be used to create a composite of two or more images and it provides the photographer with flexibility in determining the right composition for taking pictures that can be easily assembled to produce an effective composite image, that offers a lot of amusement. The invention can also be used in simple size comparison and measurement. Another application of the invention is in stereoscopic photography and, in accordance with the present invention, the desired stereoscopic pictures can easily be taken without using any complex equipment.

The present invention may be applied to motion pictures, and in accordance with the present invention, it is possible to commonly use one and the same image among a plurality of cameras or photographers, to give variety to the photographing technique, and to output images which offer a lot of amusement as a result of image compositing.

What is claimed is:

1. A digital camera, comprising:
an image pickup unit for imaging a subject to obtain second digital image data of a photographed image;
an image storing unit for storing said second digital image data of said photographed image that is obtained with said image pick up unit and first digital image data of a first image to be referenced for image compositing, or display image data of said first image having a lower resolution than said first digital image data;
an image display unit for displaying a second image being presently photographed which is not yet obtained as said photographed image, based on display image data which has a lower resolution than said second digital image data and which is not stored in said image storing unit and said first image based on said display image data having a lower resolution, which is obtained from said first digital image data read out of said image storing unit or which is directly read out of said image storing unit;
a reference image designating unit with which one or more of partial areas in said first image that is displayed on said image display unit are selected and designated as a reference image area on said image display unit; and
an image compositing unit which produces a composite image for display such that a reference image within said reference image area is displayed on said image display unit as superposed on said second image,
wherein, after said composite image for display displayed on said image display unit is confirmed, said image pick up unit photographs said second image as said photographed image and obtains said second digital image data thereof, and
said image storing unit stores the thus obtained second digital image data of said photographed image to which a second identification information indicating that said photographed image is to be composited is attached, as well as
said image storing unit stores said first digital image data or said display image data of said first image, to which a first identification information indicating that said first image is to be composited and a designated area information indicating that said designated one or more of partial areas are said reference image area designated by said reference image designating unit.

2. The digital camera according to claim 1, wherein said first digital image data of said first image is either said second digital image data of said photographed image or said first digital image data of a specified image to be quoted, and wherein said display image data of said first image is said display image data of said specified image to be quoted having a lower resolution than said first digital image data of said specified image to be quoted.

3. The digital camera according to claim 1, wherein said reference image area is displayed in a specified position, a position on said image to be referenced for image compositing or a designated position on said image display unit.

4. The digital camera according to claim 1, wherein said reference image is processed by at least one processing step selected from the group consisting of translation, rotation, resizing, density/color retouching, binarization, edge enhancement, change in painting brushwork and change in light transmittance.

5. The digital camera according to claim 1, wherein said reference image being displayed on said image display unit is automatically enlarged or reduced in accordance with a magnification of an image being presently photographed.

6. The digital camera according to claim 1, wherein said reference image designating unit performs designation of said reference image area by designating one or more of partial areas of said first image that is displayed on said image display unit.

7. The digital camera according to claim 1, wherein said image compositing unit produces said composite image for display such that said reference image within said reference image area in said first image is displayed on said image display unit as superposed on said second image at a specified light transmittance.

8. The digital camera according to claim 1, further comprising a camera control unit for performing control upon photographing such that a principal subject in said reference image and a principal subject in said image being presently photographed are equal to each other in density and color tint.

9. A digital camera comprising:
an image pickup unit for imaging a subject to obtain digital image data;
an image storing unit for storing at least said digital image data of a photographed image that is obtained with said image pick up unit;
an image display unit for displaying at least an image being presently photographed;
a reference image designating unit with which one or more of partial areas in an image to be referenced for image compositing that is displayed on said image display unit are selected and designated as a reference image area on said image display unit; and
an image compositing unit which produces a composite image such that a reference image within said reference image area is displayed on said image display unit as superposed on the image being presently photographed,
said digital camera further including a function to focus on a large number of rangefinding points, wherein a focused area of the subject is allowed to be automatically clipped out as said reference image.

10. A digital camera, comprising:
an image pickup unit for imaging a subject to obtain digital image data;
an image storing unit for storing at least said digital image data of a photographed image that is obtained with said image pick up unit;
an image display unit for displaying at least an image being presently photographed;
a reference image designating unit with which one or more of partial areas in an image to be referenced for image compositing that is displayed on said image display unit are selected and designated as a reference image area on said image display unit; and
an image compositing unit which produces a composite image such that a reference image within said reference image area is displayed on said image display unit as superposed on the image being presently photographed,
said digital camera further including a stereophotographic mode, wherein, if set to said stereophotographic mode, an area in which a focal distance is at infinity is clipped out automatically as said reference image.

11. An image processing method, comprising steps of:
photographing a subject to acquire second digital image data for a photographed image in a shooting frame with a camera; and
assembling it with at least part of first digital image data for a specified first image to be referenced for image compositing to prepare third digital image data for a composite image; further comprising the steps of:
previously storing in a storing unit of said camera said first digital image data for said specified first image or display image data for said specified first image having a lower resolution than said first digital image data;
upon photographing, designating in said image display unit of said camera selected one or more of at least partial areas in said specified first image displayed based on said display image data which is obtained from said first digital image data read out of said storing unit or which is directly read out of said storing unit as a reference image area;
displaying a composite image for display which is produced by superposing said reference image within said reference image area on a second image being presently photographed on said image display unit;
after said composite image for display displayed on said display unit has been confirmed, photographing said second image to acciuire said photographed image in said shooting frame with said camera or further to accjuire said second digital image data thereof;
attaching in said camera to said specified first image first identification information indicating that said specified first image is to be composited, and designated area information indicating that said designated one or more of at least partial areas are said reference image area of a reference image to be composited and storing said first digital image data or said display image data of said specified first image, together with said first identification information and said designated area information; and
attaching in said camera to said photographed image in said shooting frame which is to be composited with said reference image or said second digital image data thereof second identification information indicating that said photographed image in the shooting frame is to be composited and storing in said storing unit said second identification information, or said second digital image data and said second identification information; as well as
upon image outputting, reading out of said storing unit of said camera said first digital image data or said display image data for said specified first image, said first identification information and said reference image area, as well as said second identification information, or said second digital image data and said second identification information;
further, in case where said second digital image data and/or said first digital image data is not read out of said storing unit of said camera, separately obtaining said second digital image data from said photographed image in said shooting frame and/or said first digital image data which is previously prepared for said specified first image; and
preparing said third digital image data for said composite image obtained by compositing said photographed image in the shooting frame with said reference image based on said first and second identification information, said designated area information, as well as said first and second digital image data.

12. The image processing method according to claim 11, wherein,
upon photographing,
in addition to said first and second identification information, said storing unit in said camera stores processing information which refers to what processing step is to be performed or light transmittance information upon compositing which represents a specified light transmittance for use when compositing said reference image within said reference image area in said specified first image with said photographed image,
upon image outputting,
in addition to said first and second identification information, said processing information or said light transmittance information upon compositing is read out of said storing unit of said camera; and
said third digital image data for the composite image is prepared based on said first and second identification information, said designated area information and said processing information or light transmittance information upon compositing, as well as said first and second digital image data.

13. The image processing method according to claim 11, wherein,
upon photographing,
in addition to said first and second identification information, said storing unit in said camera stores information about order of image compositing,
upon image outputting,
in addition to said first and second identification information, said information about order of image compositing is read out of said storing unit of said camera; and
said information about order of image compositing in addition to said first and second identification information and said designated area information, as well as said first and second digital image data is used to prepare said third digital image data for the composite image.

14. The image processing method according to claim 11, further including a stereophotographic mode, wherein, if said stereophotographic mode is set, image data for a stereoscopic image is prepared after any positional or angular offset between image areas in which a focal distance is at infinity on frames which are to be used in the stereophotographic mode is optionally corrected.

15. The image processing method according to claim 11, wherein said third digital image data for the composite image is used for producing a composite print, recorded on an image data recording medium and delivered through a telecommunication network.

16. The image processing method according to claim 11, wherein camera control is further performed upon photographing such that a principal subject in said reference image and a principal subject in said image being presently photographed are equal to each other in density and color tint.

17. The image processing method according to claim 11, wherein adjustment is further performed when image compositing upon said image outputting such that a principal subject in said reference image and a principal subject in said image being presently photographed are equal to each other in density and color tint.

18. The image processing method according to claim 11, wherein said reference image or said image to be composited with the reference image is a motion image.

19. The digital camera according to claim 11, wherein said image compositing unit produces said composite image for display such that said reference image within said reference image area in said image to be referenced for image compositing is displayed on said image display unit as superposed on said image being presently photographed at a specified light transmittance.

20. An image processing method, comprising steps of:
photographing a subject to acciuire digital image data with a camera; and
assembling it with at least part of image data for a specified image to be referenced for image compositing to prepare image data for a composite image; further comprising the steps of:
upon photographing, designating in said camera selected one or more of at least partial areas in said specified image to be referenced for image compositing as a reference image area; attaching in said camera to said specified image to be referenced for image compositing first identification information indicating that said specified image to be referenced for image compositing is to be composited. and designated area information indicating that said designated one or more of at least partial areas are said reference image area of a reference image to be composited; and
attaching in said camera to an image in a shooting frame which is to be composited with said reference image second identification information indicating that said image in the shooting frame is to be composited; as well as
upon image outputting, preparing image data for a composite image obtained by compositing said image in the shooting frame with said reference image based on said first and second identification information as well as said designated area information,
wherein information about a large number of rangefinding points is further obtained and a focused area of the subject is allowed to be automatically clipped out as said reference image to prepare the third digital image data for the composite image.

21. An image processing method, comprising steps of:
photographing a subject to acquire second digital image data for a photographed image in a shooting frame with a camera; and
assembling it with at least part of first digital image data for a specified first image to be referenced for image compositing to prepare third digital image data for a composite image, further comprising the steps of:
previously storing in a storing unit of said camera said first digital image data for said specified first image or display image data for said specified first image having a lower resolution than said first digital image data;
upon photographing,
designating in said image display unit of said camera selected one or more of at least partial areas in said specified first image displayed based on said display image data which is obtained from said first digital image data read out of said storing unit or which is directly read out of said storing unit as a reference image area;
displaying a composite image for display which is produced by superposing said reference image within said reference image area on a second image being presently photographed on said image display unit;
after said composite image for display displayed on said display unit has been confirmed, photographing said second image to accluire said photographed image in said shooting frame with said camera or further to acciuire said second digital image data thereof;
preparing in said camera editing information including information about a name or a frame number of said specified first image that is to be composited, designated area information representing said designated one or more of at least partial areas are said reference image area of a reference image to be composited, and information about a name or a frame number of said photographed image in said shooting frame to be composited with said reference image;
storing in said storing unit of said camera said editing information and said first digital image data or said display image data for said specified first image, further or said second digital image data for said photographed image in said shooting frame; as well as
upon image outputting,
reading out of said storing unit in said camera said first digital image data or said display image data for said specified first image, and said editing information, or said editing information and said second digital image data;
further, in case where said second digital image data and/or said first digital image data is not read out of said storing unit of said camera, separately obtaining said second digital image data from said photographed image in said shooting frame and/or said first digital image data which is previously prepared for said specified first image; and
preparing said third digital image data for said composite image obtained by compositing said photographed image in the shooting frame with said reference image based on said editing information, as well as said first and second digital image data.

22. The image processing method according to claim 21, wherein said editing information further includes processing information which shows what processing step is to be performed to a designated area by said designated area information.

23. The image processing method according to claim 21, wherein said editing information further includes information about order of image compositing or light transmittance information upon compositing which represents a specified light transmittance for use in image compositing.

24. The digital camera according to claim 21, wherein said image compositing unit produces said composite image for display such that said reference image within said reference image area in said image to be referenced for image compositing is displayed on said image display unit as superposed on said image being presently photographed at a specified light transmittance.

25. An image processing method, comprising steps of:
photographing a subject to acquire second digital image data of each photographed image with each of a plurality of cameras; and
assembling it with at least part of first digital image data for a specified first image to be referenced for image compositing to prepare third digital image data for each composite image for each of said plurality of cameras; further comprising the steps of:

previously storing in a storing unit in at least one of said plurality of cameras said first digital image data for said specified first image or display image data for said specified first image having a lower resolution than said first digital image data;

upon photographing, designating at least one reference image within at least one partial area in said specified first image displayed on said image display unit of at least one of said plurality of cameras based on said display image data which is obtained from said first digital image data read out of said storing unit or which is directly read out of said storing unit with said at least one of said plurality of cameras;

attaching reference image designation data to the reference image in said at least one of said plurality of cameras and storing in said storing unit said first digital image data for the reference image or said display image data, as well as said reference image designation data;

sending and receiving said first digital image data or said display image data for said designated at least one reference image among said plurality of cameras;

displaying on respective display units in said plurality of cameras composite images for display which are produced by superposing said reference image on respective second images to be composited being presently photographed with said plurality of cameras, respectively;

after said composite images for display displayed on said respective display units in said plurality of cameras have been confirmed, respectively, photographing said respective second images to acciuire photographed images with said plurality of cameras, respectively, or further to acquire respective second digital image data thereof, respectively; and attaching respectively in said plurality of cameras to said photographed images respectively photographed with said plurality of cameras which are to be composited with the reference image group identification information indicating that said photographed images belong to a unique group and storing in said respective storing units of said plurality of cameras said group identification information, or said respective second digital image data of said photographed images and said group identification information, as well as on image outputting, reading out of said storing unit in at least one of said plurality of cameras said first digital image data or said display image data for said reference image and said reference image designation data, as well as reading out of said respective storing units of said plurality of cameras said group identification information, or said respective second digital image data of said photographed images and said group identification, respectively;

further, in case where said respective second digital image data of said photographed images is not read out of said respective storing units in said plurality of cameras, respectively and/or said first digital image data is not read out of said storing unit in said at least one of said plurality of cameras, separately obtaining said respective second digital image data of said photographed images from said photographed images in said plurality of cameras, respectively, and/or said first digital image data which is previously prepared for said specified first image; and compositing the photographed images respectively photographed with said plurality of cameras with said at least one reference image by using said respective second digital imaged data of said photographed images respectively photographed with said plurality of cameras, said first digital image data for said at least one reference image, said reference image designation data and said group identification information to obtain respective composite images.

26. An image processing method, comprising steps of:

photographing a subject to acquire digital image data with a camera; and assembling it with at least part of image data for a specified image to be referenced for image compositing to prepare image data for a composite image; further comprising the steps of:

upon photographing, designating in said camera selected one or more of partial areas in said specified image to be referenced for image compositing as a reference image area; and preparing in said camera editing information including information about a name or a frame number of said specified image to be referenced for image compositing that is to be composited, designated area information representing said designated one or more of at least partial areas are said reference image area of a reference image to be compo sited, and information about a name or a frame number of an image in a shooting frame to be composited with said reference image, as well as upon image outputting, preparing image data for a composite image obtained by compositing said image in the shooting frame with said reference image based on said editing information, wherein information about a large number of rangefinding points is further obtained and a focused area of the subject is allowed to be automatically clipped out as said reference image to prepare the third digital image data for the composite image.

27. An image processing method, comprising steps of:

photographing a subject to acquire digital image data with each of a plurality of cameras; and assembling it with image data for a specified image to be referenced for image compositing to prepare image data for a composite image; further comprising the steps of:

upon photographing, designating at least one reference image within at least one partial area in said specified image to be referenced for image compo siting with at least one of said plurality of cameras;

attaching reference image designation data to the reference image in said at least one of said plurality of cameras;

sending and receiving image data for said designated at least one reference image among said plurality of cameras; and attaching respectively in said plurality of cameras to photographed images respectively photographed with said plurality of cameras which are to be composited with the reference image group identification information indicating that the photographed images belong to a unique group, as well as on image outputting, compositing the photographed images respectively photographed with said plurality of cameras with said at least one reference image by using the photographed images respectively photographed with said plurality of cameras, said reference image designation data and said group identification information,
wherein information about a large number of rangefinding points is further obtained and a focused area of the subject is allowed to be automatically clipped out as said reference image to prepare the image data for the composite image.

* * * * *